US012584997B2

(12) United States Patent
Oshiro et al.

(10) Patent No.: US 12,584,997 B2
(45) Date of Patent: Mar. 24, 2026

(54) STANDING WAVE RADAR, OCCUPANT DETECTION SYSTEM, AND OBJECT DETECTION METHOD

(71) Applicant: ALPS ALPINE CO., LTD., Tokyo (JP)

(72) Inventors: Kazunori Oshiro, Miyagi (JP); Hideki Masudaya, Miyagi (JP); Masahiro Ishibashi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 365 days.

(21) Appl. No.: 18/325,392

(22) Filed: May 30, 2023

(65) Prior Publication Data

US 2024/0036160 A1 Feb. 1, 2024

(30) Foreign Application Priority Data

Jul. 29, 2022 (JP) ................................. 2022-121716

(51) Int. Cl.
| | |
|---|---|
| *G01S 7/35* | (2006.01) |
| *B60R 22/48* | (2006.01) |
| *G01S 7/41* | (2006.01) |
| *G01S 13/88* | (2006.01) |

(52) U.S. Cl.
CPC .............. *G01S 7/356* (2021.05); *B60R 22/48* (2013.01); *G01S 7/411* (2013.01); *G01S 13/88* (2013.01); *B60R 2022/4808* (2013.01)

(58) Field of Classification Search
CPC .......... G01S 7/356; G01S 7/411; G01S 13/88; G01S 13/931; B60R 22/48; B60R 2022/4808
See application file for complete search history.

(56) References Cited

U.S. PATENT DOCUMENTS

| | | | |
|---|---|---|---|
| 7,642,907 B2 * | 1/2010 | Tang ....................... | B60R 22/48 |
| | | | 340/457.1 |
| 2020/0256948 A1 * | 8/2020 | Jansen .................... | G01S 13/34 |
| 2023/0314560 A1 * | 10/2023 | Wu ......................... | G01S 13/42 |
| | | | 342/173 |

FOREIGN PATENT DOCUMENTS

| | | | | |
|---|---|---|---|---|
| JP | 2010-271088 | | 12/2010 | |
| JP | 2010271088 | A * | 12/2010 ............. | G01S 13/32 |
| JP | 6261022 | B1 * | 1/2018 | |

OTHER PUBLICATIONS

English translation of JP-2010271088-A (Year: 2010).*
English translation of JP-6261022-B1 (Year: 2018).*

* cited by examiner

*Primary Examiner* — Vladimir Magloire
*Assistant Examiner* — Naomi M Wolford
(74) *Attorney, Agent, or Firm* — IPUSA, PLLC

(57) ABSTRACT

A standing wave radar includes: a transmitter to set a frequency of a transmission signal to frequencies, and output the transmission signal taking the respective frequencies in a time-division manner; a receiver to receive a reflected signal taking the frequencies in a time-division manner, the reflected signal being the transmission signal reflected by an object; and a processor to obtain reflection coefficients of the frequencies by obtaining each reflection coefficient of the transmission signal and the reflected signal taking a same frequency, for the transmission signal and the reflected signal taking the frequencies, and to execute a first inverse Fourier transform process of calculating a first distance spectrum for the object by an inverse Fourier transform on the reflection coefficients, and a first distance measurement process of determining presence of the object and calculating a distance to the object, based on the first distance spectrum.

5 Claims, 5 Drawing Sheets

FIRST DISTANCE
SPECTRUM DS11 d11

FIRST DISTANCE
SPECTRUM DS12 d12

SECOND DISTANCE
SPECTRUM △DS13 d13

STANDING WAVE RADAR, OCCUPANT DETECTION SYSTEM, AND OBJECT DETECTION METHOD

CROSS-REFERENCE TO RELATED APPLICATIONS

The present application is based upon and claims priority under 35 U.S.C. § 119 to Japanese Patent Application No. 2022-121716 filed on Jul. 29, 2022, the entire contents of which are incorporated herein by reference.

BACKGROUND OF THE INVENTION

1. Field of the Invention

The present disclosure relates to a standing wave radar, an occupant detection system, and an object detection method.

2. Description of the Related Art

Conventionally, there has been a distance measuring method that includes a step of generating a traveling wave from a signal source; a step of detecting a standing wave generated by interference between the traveling wave and a reflected wave generated by reflection of the traveling wave on an object, or a mixed wave generated by the traveling wave and the reflected wave; a step of calculating a distance spectrum by frequency analysis of the standing wave or the mixed wave; and a step of determining the distance to the object from phase information on the distance spectrum. In the frequency analysis, a distance spectrum having a phase term that does not include a distance variable is calculated by executing a Fourier transform on the standing wave or the mixed wave (e.g., see Japanese Laid-Open Patent Application No. 2010-271088 (Patent Document 1)).

Meanwhile, in a conventional distance measuring method using a standing wave radar, a distance spectrum is calculated by executing a Fourier transform on a standing wave or a mixed wave, and a distance to an object is obtained from a peak position of the distance spectrum. However, it has been difficult to detect an object at a short distance, only by simply executing a Fourier transform on a standing wave or a mixed wave because a DC component corresponding to a distance of zero exists. In order to solve this problem, in Patent Document 1, in order to remove the DC component, it is necessary to execute measurement at multiple points by measuring the standing wave or the mixed wave at the multiple points and executing a Fourier transform on an analysis signal to which processing such as differentiation is applied.

SUMMARY OF THE INVENTION

According to an embodiment in the present disclosure, a standing wave radar includes a transmitter configured to set a frequency of a transmission signal to multiple frequencies, and output the transmission signal taking the respective frequencies in a time-division manner; a receiver configured to receive a reflected signal taking the multiple frequencies in a time-division manner, the reflected signal being the transmission signal taking the multiple frequencies reflected by an object; and a processor configured to obtain reflection coefficients of the multiple frequencies by obtaining each reflection coefficient of the transmission signal and the reflected signal taking a same frequency with each other, for the transmission signal taking the multiple frequencies and the reflected signal taking the multiple frequencies, and to execute a first inverse Fourier transform process of calculating a first distance spectrum for the object by executing an inverse Fourier transform on the reflection coefficients of the multiple frequencies, and a first distance measurement process of determining presence or absence of the object and calculating a distance to the object, based on the first distance spectrum.

DESCRIPTION OF THE PREFERRED EMBODIMENTS

In the following, embodiments to which a standing wave radar, an occupant detection system, and an object detection method in the present disclosure are applied will be described.

According to an embodiment in the present disclosure, a standing wave radar, an occupant detection system, and an object detection method can be provided to detect an object at a short distance with a simple configuration without measuring at multiple points, by calculating a distance spectrum to the object by executing an inverse Fourier transform on a reflection coefficient of a reflected signal with respect to a transmission signal.

EMBODIMENTS

Figure 1:
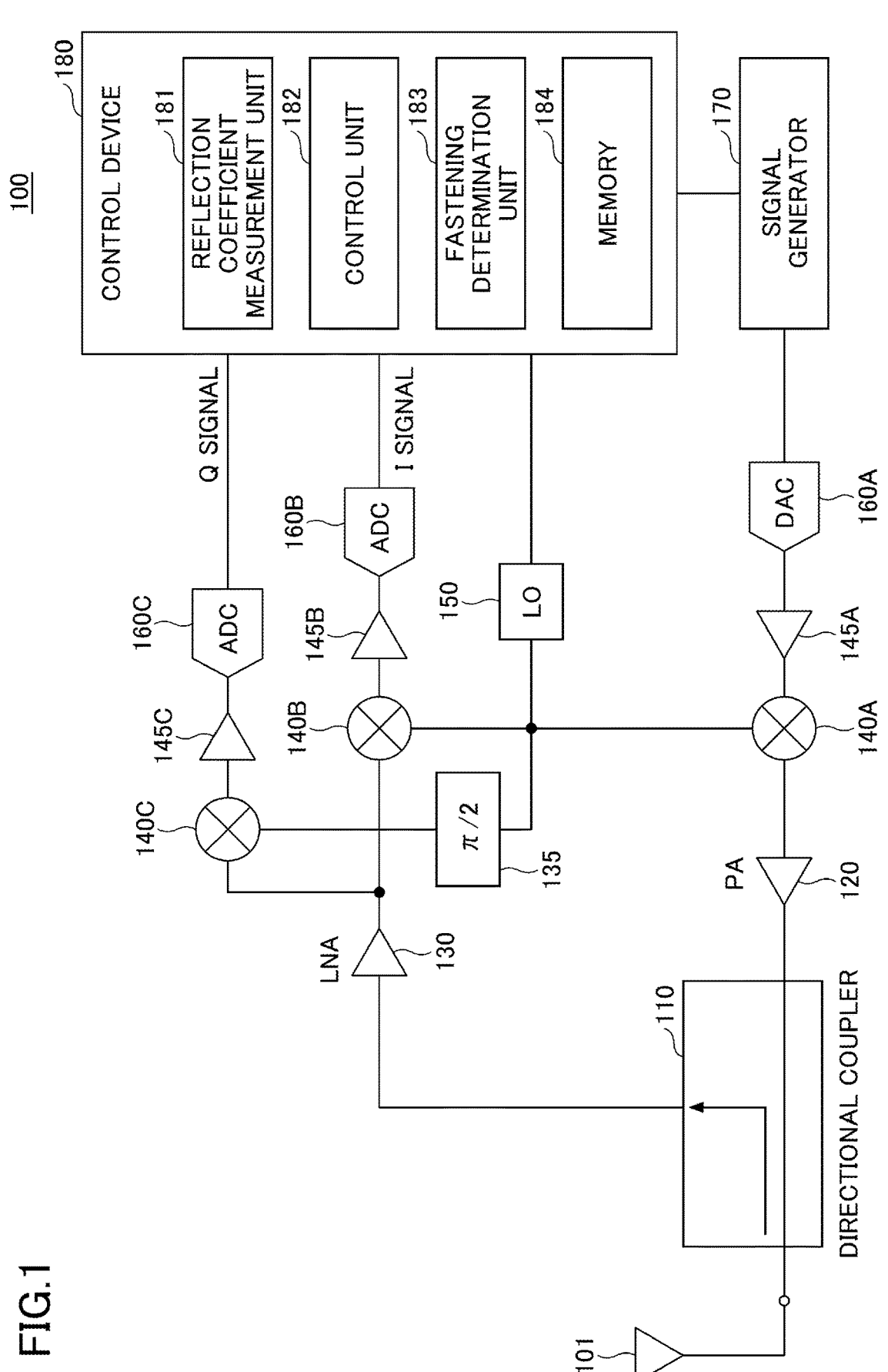
FIG. 1 is a diagram illustrating an example of a configuration of a standing wave radar 100 according to an embodiment.

FIG. 1 is a diagram illustrating an example of a configuration of a standing wave radar 100 according to an embodiment.

Here, as an example, a form will be described in which a standing wave radar 100 is arranged in the interior of a vehicle; an object to be detected is an occupant with motion such as body motion, or a (stationary) object without motion; and the standing wave radar 100 determines presence or absence of an occupant, and calculates the distance to the object.

The standing wave radar 100 determines presence or absence of an occupant by determining whether the object is stationary or not. Determining the presence or absence of an occupant is equivalent to detecting the occupant. The standing wave radar 100 can detect a subtle motion such as breathing by an occupant, and hence, can distinguish between an occupant exhibiting a body motion such as breathing and an object placed on a seat and standing still without any motion. In other words, the standing wave radar 100 can detect an occupant. Therefore, the standing wave radar 100 may be treated as an occupant detection device. However, the standing wave radar 100 is not limited to such use, and can determine presence or absence of various objects (stationary objects or non-stationary objects) and execute distance measurement. Determining the presence or absence of an object is equivalent to detecting the object.

In addition, in the following, as an example, a form will be described in which the standing wave radar 100 determines presence or absence of an object, measures the distance, and detects whether or not a seat belt is being fastened.

The standing wave radar 100 determines presence or absence of an occupant and measures a distance, and detects whether or not a seat belt is being fastened, by switching, in a time-division manner, between a period (occupant detection period) during which a transmission signal is transmitted, and based on a reflected signal reflected by an object, presence or absence of an occupant is determined, and the distance to the object is calculated; and a period (fastening detection period) during which a transmission signal is transmitted, a response signal from an RFID (Radio Frequency Identifier) tag provided in a buckle of a seat belt is received, to detect whether or not the seat belt is being fastened. During the fastening detection period, a transmission signal modulated by a detection signal for detecting whether or not the seat belt is being fastened is transmitted. The RFID tag is an example of a detector. Although the RFID tag may be either a passive type or an active type, here, as an example, a form of adopting a passive type will be described.

The standing wave radar 100 includes an antenna 101, a directional coupler 110, a power amplifier (PA) 120, a low noise amplifier (LNA) 130, a delay element 135, a mixer 140A, a mixer 140B, a mixer 140C, an amplifier 145A, an amplifier 145B, an amplifier 145C, a carrier wave output unit (LO) 150, a digital-to-analog converter (DAC) 160A, an analog-to-digital converter (ADC) 160B, an ADC 160C, a signal generator 170, and a control device 180.

The antenna 101, the directional coupler 110, the PA 120, and the carrier wave output unit 150 constitute an example of a transmitter during the occupant detection period. In addition, the antenna 101, the directional coupler 110, the PA 120, the mixer 140A, the amplifier 145A, the carrier wave output unit 150, the DAC 160A, and the signal generator 170 constitute an example of a transmitter during the fastening detection period.

The standing wave radar 100 may have a configuration to transmit a transmission signal that is not modulated by a detection signal, and in this case, the configuration may not include the mixer 140A, the amplifier 145A, the DAC 160A, and the signal generator 170. The standing wave radar 100 that transmits a transmission signal not modulated by a detection signal determines presence or absence of an occupant, and calculates a distance to an object, without detecting whether or not a seat belt is being fastened. In addition, in this case, the control device 180 of the standing wave radar 100 has a configuration that does not include a fastening determination unit 183 (a determiner for determining whether or not a seat belt is being fastened) that will be described later.

The antenna 101, the directional coupler 110, the LNA 130, the delay element 135, the mixer 140B, the mixer 140C, the amplifier 145B, the amplifier 145C, the carrier wave output unit 150, the DAC 160A, the ADC 160B, and the ADC 160C constitute an example of a receiver.

The antenna 101 is connected to the directional coupler 110, and transmits a transmission signal toward an object. The antenna 101 receives a reflected signal as the transmission signal reflected on an object, and outputs the reflected signal to the directional coupler 110. In addition, the antenna 101 transmits a transmission signal toward an RFID tag, receives a reflected signal, and outputs the reflected signal to the directional coupler 110. The reflected signal transmitted by the RFID tag is an example of a response signal. The antenna 101 receives a reflected signal reflected by an object or a reflected signal of an RFID tag.

The directional coupler 110 is provided between the antenna 101, the PA 120, and the LNA 130, and outputs the transmission signal amplified by the PA 120 to the antenna 101, and outputs the reflected signal received by the antenna 101 to the LNA 130. The standing wave radar 100 may include a circulator instead of the directional coupler 110. In addition, the standing wave radar 100 may not include the directional coupler 110, and instead of the antenna 101, may include an antenna for transmission and an antenna for reception connected to the PA 120 and the LNA 130, respectively.

The PA 120 is provided between the directional coupler 110 and the mixer 140A, amplifies a transmission signal output from the mixer 140A, and outputs the amplified signal to the directional coupler 110. The transmission signal is a signal output by the signal generator 170 (a detection signal for detecting whether a seat belt is being fastened), which is a signal obtained by modulating a carrier wave output by the carrier wave output unit 150.

The LNA 130 is provided between the directional coupler 110 and the mixer 140B and 140C, amplifies a reflected signal that is received by the antenna 101 and passed through the directional coupler 110, and outputs the amplified signal to the mixers 140B and 140C.

The delay element 135 is provided between the mixer 140C and the carrier wave output unit 150, and delays the phase of a carrier wave (local signal) output from the carrier wave output unit 150 by π/2, and outputs the delayed signal to the mixer 140C.

The mixer 140A is provided between the carrier wave output unit 150, the amplifier 145A, and the PA 120. During the occupant detection period, the mixer 140A outputs a carrier wave output from the carrier wave output unit 150 as it is as a transmission signal. In addition, during the fastening detection period, the mixer 140A outputs a transmission signal obtained by modulating a carrier wave output from the carrier wave output unit 150 by a detection signal output from the amplifier 145A to the PA 120. The detection signal is a signal for detecting whether a seat belt is being fastened.

The mixer 140B is provided between the LNA 130, the carrier wave output unit 150, and the amplifier 145B, and outputs a demodulated signal obtained by demodulating a reflected signal amplified by the LNA 130 to the amplifier 145B, by a carrier wave output from the carrier wave output unit 150.

The mixer 140C is provided between the LNA 130, the delay element 135, and the amplifier 145C, and outputs a demodulated signal obtained by demodulating a reflected signal amplified by the LNA 130 to the amplifier 145C, by the carrier wave whose phase is delayed by π/2 by the delay element 135.

The amplifier 145A is provided between the DAC 160A and the mixer 140A. During the fastening detection period, the amplifier 145A amplifies an analog-converted detection signal output from the DAC 160A, and outputs the amplified signal to the mixer 140A. Note that during the occupant detection period, the signal generator 170 does not output a detection signal, and the amplifier DAC 160A does not output an analog-converted detection signal; therefore, the amplifier 145A is in a state of not outputting a signal.

The amplifier 145B is provided between the mixer 140B and the ADC 160B, and amplifies the demodulated signal output from the mixer 140B and outputs the amplified signal to the ADC 160B.

The amplifier 145C is provided between the mixer 140C and the ADC 160C, amplifies the demodulated signal output from the mixer 140C, and outputs the amplified signal to the ADC 160C.

The carrier wave output unit 150 is controlled by the control device 180, and outputs a carrier wave (local signal (LO)) to the mixer 140A, the mixer 140B, and the delay element 135. During the occupant detection period, the carrier wave output unit 150 is controlled by the control unit 181 to sequentially set the frequency of a carrier wave to multiple frequencies in order in a time-division manner, to output the carrier wave. In addition, during the fastening detection period, the carrier wave output unit 150 is controlled by the control unit 181 to set the frequency of a carrier wave to a frequency for an RFID tag, to output the carrier wave. Note that setting the frequency of a carrier wave to multiple frequencies in order in a time-division manner to output the carrier wave means that the frequency of the carrier wave may be switched to multiple discrete (digital) frequencies in a time-division manner to output the carrier wave, or the frequency of the carrier wave may be switched in a time-division manner to multiple continuous (analog) frequencies to output the carrier wave. By having the carrier wave output unit 150 set the frequency of the carrier wave to multiple frequencies in order in a time-division manner and to output the carrier wave, a transmission signal whose frequency is set to multiple frequencies in order in a time-division manner is output. The transmission signal may be a chirp signal.

The DAC 160A is provided between the signal generator 170 and the amplifier 145A. During the fastening detection period, the DAC 160A converts a detection signal output from the signal generator 170 into an analog signal, and outputs the analog signal to the amplifier 145A. In addition, during the occupant detection period, the signal generator 170 does not output a detection signal; therefore, the DAC 160A is in a state of not outputting a signal.

The ADC 160B is provided between the amplifier 145B and the control device 180, and converts a demodulated signal amplified by the amplifier 145B into a digital signal, and outputs the digital signal as an I signal to a processor 70.

The ADC 160C is provided between the amplifier 145C and the control device 180, and converts a demodulated signal amplified by the amplifier 145C into a digital signal, and outputs the digital signal as an Q signal to the processor 70. The Q signal has a phase delayed by $\pi/2$ (90 degrees) with respect to the I signal.

During the fastening detection period, the signal generator 170 outputs a detection signal for detecting whether a seat belt is being fastened. The detection signal is received by an RFID tag provided in a buckle of a seat belt of the vehicle. When an occupant fastens a seat belt and the tongue plate is inserted into the buckle, the value of a sensor connected to the RFID tag changes, and thereby, the reflected signal output from the RFID tag changes. By reading the reflected signal of the RFID tag, the standing wave radar 100 can detect whether or not the seat belt is being fastened. The signal generator 170 does not output a detection signal during the occupant detection period.

The control device 180 includes, as an example, a micro controller unit (MCU). The MCU is implemented by a computer that includes a central processing unit (CPU), a random access memory (RAM), a read only memory (ROM), an input/output interface, an internal bus, and the like.

The control device 180 includes a control unit 181, a reflection coefficient measurement unit 182, a fastening determination unit 183, and a memory 184. The memory 184 is an example of a storage. The control unit 181, the reflection coefficient measurement unit 182, and the fastening determination unit 183 are units that are represented as functional blocks for functions of a program executed by the control device 180. In addition, the memory 184 is a functional representation of the memory of the control device 180.

During the occupant detection period, when the standing wave radar 100 transmits a transmission signal, the control unit 181 controls the carrier wave output unit 150 to output the transmission signal taking multiple frequencies in a time-division manner. Accordingly, the transmitter of the standing wave radar 100 sets the frequency of the transmission signal to multiple frequencies, and outputs the transmission signal taking the respective frequencies in a time-division manner. In addition, as a result, the receiver of the standing wave radar 100 receives a reflected signal taking the multiple frequencies in a time-division manner, which is the transmission signal taking the multiple frequencies reflected by the object. The control unit 181 receives an I signal and a Q signal as the reflected signals.

During the occupant detection period, the reflection coefficient measurement unit 182 obtains reflection coefficients of the multiple frequencies by obtaining each reflection coefficient of the transmission signal and the reflected signal taking the same frequency with each other, for the transmission signal taking the multiple frequencies and the reflected signal taking the multiple frequencies.

During the occupant detection period, the control unit 181 executes a first inverse Fourier transform process of calculating a first distance spectrum for an object by executing an inverse Fourier transform on the reflection coefficients of the multiple frequencies, and a first distance measurement process of determining presence or absence of an object and calculating the distance to the object, based on the first distance spectrum.

In addition, during the occupant detection period, the control unit 181 executes a storing process of obtaining the reflection coefficients of the multiple frequencies repeatedly determined at predetermined time intervals by the reflection coefficient measurement unit 182, and storing the reflection coefficients in the memory 184. For each of the multiple frequencies, the control unit 181 obtains a difference between a reflection coefficient stored in the memory 184 in the previous storing process and a reflection coefficient stored in the memory 184 in the current storing process. The previous storing process is a storing process in a previous control period. The current storing process is a storing process in a current control period.

By executing an inverse Fourier transform on the difference obtained for each of the multiple frequencies, the control unit 181 executes a second inverse Fourier transform process of calculating a second distance spectrum for a non-stationary object, and a second distance measurement process of determining presence or absence of a non-stationary object and calculating the distance to the non-stationary object, based on a second distance spectrum;

In addition, during the occupant detection period, the control unit 181 determines whether an object that has reflected the transmission signal is a non-stationary object or a stationary object, based on the first distance spectrum and the second distance spectrum. Note that the process executed by the control unit 181 during the occupant detection period will be described in detail later with reference to a flow chart.

In addition, during the fastening detection period, when transmitting a transmission signal, the control unit 181 controls the carrier wave output unit 150 to output the transmission signal of a frequency for an RFID tag. In addition, during the fastening detection period, the reflection coefficient measurement unit 182 does not execute a process of determining the reflection coefficient. In addition, during the fastening detection period, the control unit 181 does not execute the first inverse Fourier transform process, the first distance measurement process, the second inverse Fourier transform process, and the second distance measurement process.

During the fastening detection period, the fastening determination unit 183 determines whether a seat belt is being fastened according to the signal level of the reflected signal from the RFID tag. In this way, by having the fastening determination unit 183 determine whether or not the seat belt is being fastened, the standing wave radar 100 can detect whether or not the seat belt is being fastened. Note that the reflected signal from the RFID tag is input into the control device 180 as an I signal and a Q signal, as in the case of the reflected signal during the occupant detection period.

The memory 184 stores the reflection coefficients of the multiple frequencies repeatedly determined at predetermined time intervals by the reflection coefficient measurement unit 182 according to a storing process executed by the control unit 181. The memory 184 holds the reflection coefficients stored by the previous storing process of the control unit 181 and the reflection coefficients stored by the current storing process. In addition, the memory 184 stores programs and data necessary for processes executed by the control device 180.

<Distance Spectrum>

Figure 2:
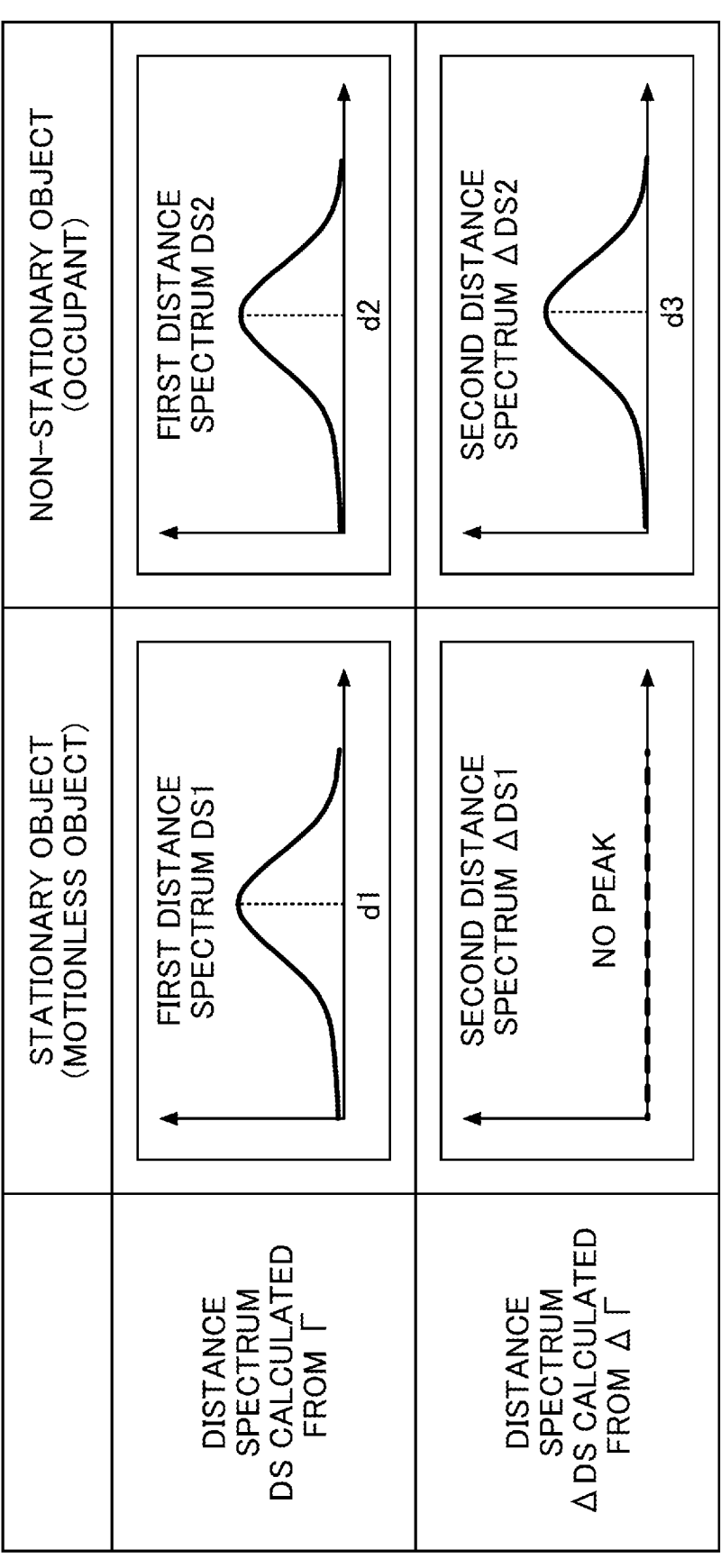
FIG. 2 is a diagram illustrating distance spectra obtained from reflection coefficients.

FIG. 2 is a diagram illustrating distance spectra obtained from reflection coefficients. On the upper side in FIG. 2, distance spectra DS are illustrated that are obtained by executing an inverse Fourier transform on reflection coefficients $\Gamma$ obtained by measuring a stationary object (motionless object) and a non-stationary object (occupant). In addition, on the lower side in FIG. 2, distance spectra $\Delta$DS are illustrated that are obtained by executing an inverse Fourier transform on a difference $\Delta\Gamma$ between two reflection coefficients $\Gamma(T1)$ and $\Gamma(T2)$ obtained by two measurements in a period of time T1 and a period of time T2. The periods of time T1 and T2 are periods of time that do not overlap each other. An occupant is a non-stationary object because the occupant exhibits motion of the body such as moving his/her body by breathing, moving his/her hands and feet, moving his/her body itself, and the like.

<Distance Spectrum DS>

During a period of time T such as the periods of time T1 and T2, for a transmission signal taking multiple frequencies fi (i=1 to N) transmitted in a time-division manner and a reflected signal taking the multiple frequencies fi (i=1 to N) received in a time-division manner, the reflection coefficient measurement unit 182 obtains reflection coefficients of the transmission signal and the reflected signal taking the same frequency fi (i=1 to N) with each other, and thereby, reflection coefficients $\Gamma i$ (i=1 to N) of the multiple frequencies fi (i=1 to N) are obtained. During the period of time T, the transmission interval of the transmission signal taking the multiple frequencies fi (i=1 to N) transmitted in a time-division manner is an example of a predetermined time interval, and is a constant time interval.

By executing an inverse Fourier transform on the reflection coefficients $\Gamma i$ (i=1 to N) of the multiple frequencies fi (i=1 to N), the control unit 181 executes the first inverse Fourier transform process of calculating a first distance spectrum for the object, and thereby, obtains a first distance spectrum DS from the reflection coefficients $\Gamma i$ (i=1 to N). In the first distance spectrum DS, the horizontal axis represents the distance from the antenna 101, and a distance on the horizontal axis is a distance corresponding to the time elapsed since the transmission signal is reflected by the object. Therefore, on the horizontal axis, the left side indicates that the distance is shorter, and the right side indicates that the distance is longer. The vertical axis of the first distance spectrum DS represents the value of the distance spectrum. The control unit 181 executes the first distance measurement process of determining presence or absence of an object and calculating the distance to the object, based on the first distance spectrum DS.

As an example, assume that, for a stationary object (motionless object), a first distance spectrum DS1 as illustrated on the left side of the upper side in FIG. 2 is obtained. The object is located at a position of a distance d1 at which the peak of the first distance spectrum DS1 is observed. In this case, as the first distance spectrum DS1 has a peak, the control unit 181 determines that an object is present, and based on the position of the peak, calculates the distance d1 to the object. Note that the peak is a maximal value of the value of the distance spectrum that is greater than or equal to a threshold set according to the situation, and the position of the peak is a position at which the distance from the antenna 101 takes a maximal value of the value of the distance spectrum. In the case where there is no maximal value greater than or equal to the threshold value (in the case of a flat spectrum), the control unit 181 determines that there is no peak, and determines that there is no object.

In addition, as an example, assume that, for a non-stationary object (non-motionless object), a first distance spectrum DS2 as illustrated on the right side of the upper side in FIG. 2 is obtained. The object is located at a position of a distance d2 at which the peak of the first distance spectrum DS2 is observed. In this case, the control unit 181 determines that there is an object because the distance spectrum DS2 has a peak, and calculates the distance d2 to the object based on the position of the peak.

In this way, from the first distance spectra DS1 and DS2 obtained by executing the inverse Fourier transform on the reflection coefficients $\Gamma i$ (i=1 to N) of the multiple frequencies fi (i=1 to N), the control unit 181 can determine presence or absence of a stationary object (motionless object) and a non-stationary object (non-motionless object) and the distance to the object; however, it is not possible to determine whether the object is a stationary object (motionless object) or a non-stationary object (non-motionless object).

<Distance Spectrum $\Delta$DS>

The distance spectra $\Delta$DS illustrated on the lower side in FIG. 2 are distance spectra obtained by executing an inverse Fourier transform on a difference $\Delta\Gamma$ between two reflection coefficients $\Gamma(T1)$ and $\Gamma(T2)$ obtained by two measurements in the period of time T1 and the period of time T2.

For a transmission signal taking the multiple frequencies fi (i=1 to N) and a reflected signal taking the multiple frequencies fi (i=1 to N) in the period of time T1, the reflection coefficient measurement unit 182 obtains reflection coefficients of the transmission signal and the reflected signal taking the same frequency fi (i=1 to N) with each other, and thereby, the reflection coefficients Γi1 (i=1 to N) of the multiple frequencies fi (i=1 to N) are obtained in the period of time T1. In addition, for a transmission signal taking the multiple frequencies fi (i=1 to N) and a reflected signal taking the multiple frequencies fi (i=1 to N) in the period of time T2, the reflection coefficient measurement unit 182 obtains reflection coefficients of the transmission signal and the reflected signal taking the same frequency fi (i=1 to N) with each other, and thereby, the reflection coefficients Γi1 (i=1 to N) of the multiple frequencies fi (i=1 to N) are obtained in the period of time T2.

The control unit 181 executes a storing process of storing the reflection coefficients Γi1 (i=1 to N) of the multiple frequencies fi (i=1 to N) obtained for the period of time T1, and the reflection coefficients Γi2 (i=1 to N) of the multiple frequencies fi (i=1 to N) obtained for the period of time T2 in the memory 184.

For each of the multiple frequencies fi (i=1~N), the control unit 181 obtains a difference ΔΓi between the reflection coefficient Γi1 stored in the memory 184 in the previous storing process (in the period of time T1) and the reflection coefficient Γi2 stored in the memory 184 in the current storing process (in the period of time T2). In other words, differences ΔΓi (i=1 to N) are obtained for the multiple frequencies fi (i=1 to N).

By executing an inverse Fourier transform on the differences ΔΓi (i=1 to N) for the reflection coefficients for the multiple frequencies fi (i=1 to N), the control unit 181 executes an inverse Fourier transform process of calculating a distance spectrum for the non-stationary object, and determining a second distance spectrum ΔDS for the non-stationary object. In the second distance spectrum ΔDS, the horizontal axis represents the distance from the antenna 101, and a distance on the horizontal axis is a distance corresponding to the time elapsed since the transmission signal is reflected by the object. Therefore, as in the case of the first distance spectrum, on the horizontal axis, the left side indicates that the distance is shorter, and the right side indicates that the distance is longer. The vertical axis of the second distance spectrum ΔDS represents the value of the distance spectrum. The control unit 181 executes a distance measurement process of determining presence or absence of a non-stationary object and calculating the distance to the non-stationary object, based on the second distance spectrum ΔDS.

As an example, assume that a second distance spectrum ΔDS1 as illustrated on the left side of the lower side in FIG. 2 is obtained. The distance spectrum ΔDS1 is a flat distance spectrum that has no peak. In the case where a flat distance spectrum as such is obtained, the spectrum indicates that the position of an object does not change in the period of time T1 and the period of time T2.

In addition, as an example, assume that a second distance spectrum ΔDS2 as illustrated on the right side of the lower side in FIG. 2 is obtained. The second distance spectrum ΔDS2 has a peak at a position of a distance d3. In this case, the second distance spectrum ΔDS2 has a peak; therefore, the control unit 181 determines that a non-stationary object is present, and based on the position of the peak, calculates the distance d3 to the non-stationary object.

In this way, by executing the inverse Fourier transform on the differences ΔΓi (i=1 to N) between the reflection coefficients Γi1 stored in the memory 184 in the previous storing process (in the period of time T1) and the reflection coefficients Γi2 stored in the memory 184 in the current storing process (of the period of time T2), presence of a non-stationary object and the distance d3 to the non-stationary object can be determined.

Figure 3A:
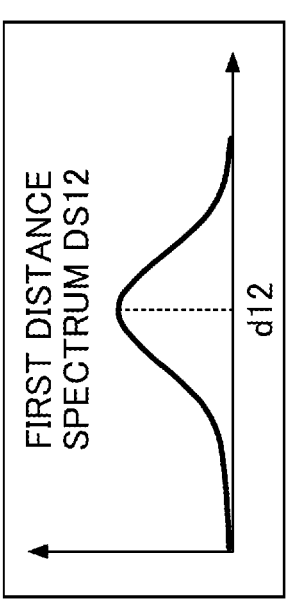
FIGS. 3A to 3C are diagrams illustrating a specific example of a method of obtaining a second distance spectrum ΔDS.
Figure 3B:
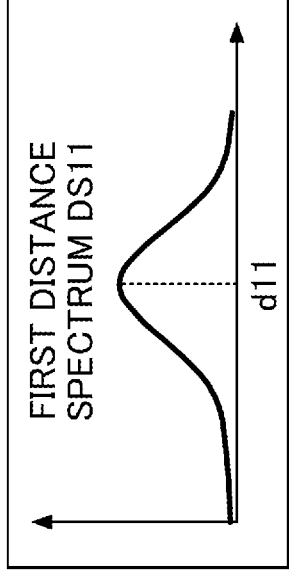
Figure 3C:
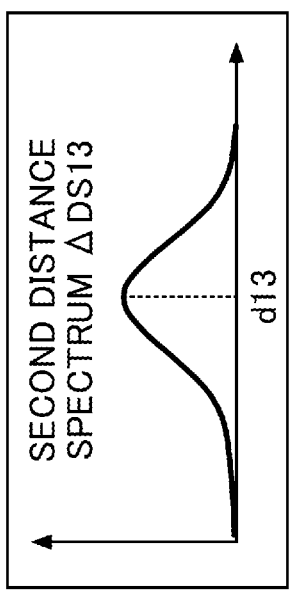

FIGS. 3A to 3C are diagrams illustrating a specific example of a method of obtaining a second distance spectrum ΔDS. As an example, assume that, by executing the inverse Fourier transform on the reflection coefficients Γi1 (i=1 to N) of the multiple frequencies fi (i=1 to N) in the period of time T1, a first distance spectrum DS11 illustrated in FIG. 3A is obtained. The first distance spectrum DS11 has a peak at a distance d11. In addition, assume that, by executing the inverse Fourier transform on the reflection coefficients Γi2 (i=1 to N) of the multiple frequencies fi (i=1 to N) in the period of time T2, a first distance spectrum DS12 illustrated in FIG. 3B is obtained. The first distance spectrum DS12 has a peak at a distance d12.

In such a case, by obtaining a differences between a reflection coefficient Γi1 (i=1 to N) of the multiple frequencies fi (i=1 to N) in the period of time T1 and a reflection coefficient Γi2 (i=1 to N) of the multiple frequencies fi (i=1 to N) in the period of time T2 for each of the multiple frequencies fi (i=1 to N), differences ΔΓi (i=1 to N) between the reflection coefficients for the multiple frequencies fi (i=1 to N) are obtained. In addition, assume that an inverse Fourier transform is further executed on the differences ΔΓi (i=1 to N) of the reflection coefficients, and the second distance spectrum ΔDS13 illustrated in FIG. 3C is obtained. The second distance spectrum ΔDS13 illustrated in FIG. 3C has a peak at a distance d13. In this case, the distance d13 is obtained by executing an inverse Fourier transform on the differences ΔΓi (i=1 to N) between the reflection coefficients Γi1 (i=1 to N) and the reflection coefficients Γi2 (i=1 to N); therefore, the distance d13 is a midpoint between the distance d11 illustrated in FIG. 3A and the distance d12 illustrated in FIG. 3B.

<Occupant Detection System 200>

Figure 4A:
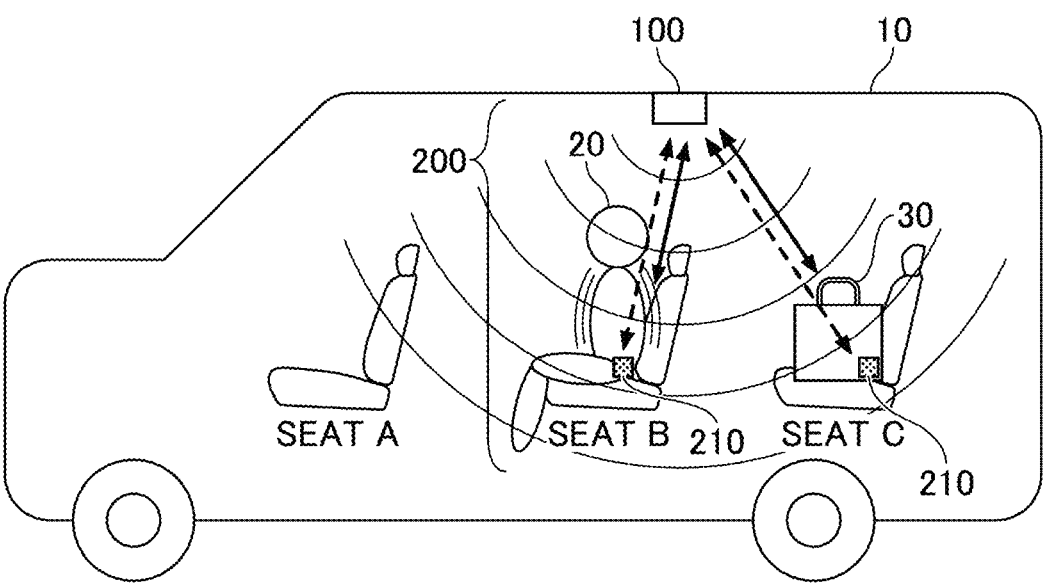
FIG. 4A is a diagram illustrating an example of an occupant detection system 200 installed on a vehicle 10.

FIG. 4A is a diagram illustrating an example of an occupant detection system 200 installed on a vehicle 10. The occupant detection system 200 is installed on the vehicle 10. The occupant detection system 200 includes a standing wave radar 100 and RFID tags 210.

FIG. 4A illustrates a state of the vehicle 10 as viewed transparently from the left side. The vehicle 10 includes seats A, B, and C. The seat A is a front seat, the seat B is a seat in the second row, and seat C is a seat in the third row. A standing wave radar 100 is provided on the ceiling of the interior of the vehicle 10, and the standing wave radar 100 is capable of transmitting a transmission signal to the seats A, B, and C. Concentric circular arcs in FIG. 4A indicate ranges reachable by a transmission signal. In addition, solid-line arrows indicate paths of transmission signals for detecting objects, and broken-line arrows indicate paths of transmission signals transmitted from the standing wave radar 100 to the RFID tags 210 and reflected signals output from the RFID tags 210.

On each of the seats B and C, as an example, the RFID tag 210 is attached to the buckle of the seat belt, and once the tongue plate of the seat belt is fitted into the buckle, the static capacitance of the RFID tag 210 changes, and the signal level of the reflected signal output by the RFID tag 210 changes. By reading the reflected signal of the RFID tag 210, the standing wave radar 100 detects whether or not the seat belt is being fastened. Fastening a seat belt means that the tongue plate of the seat belt is being fitted into the buckle.

As an example, as illustrated in FIG. 4A, assume that an occupant 20 sits on the seat B and fastens the seat belt, and a baggage 30 is placed on the seat C.

Figure 4B:
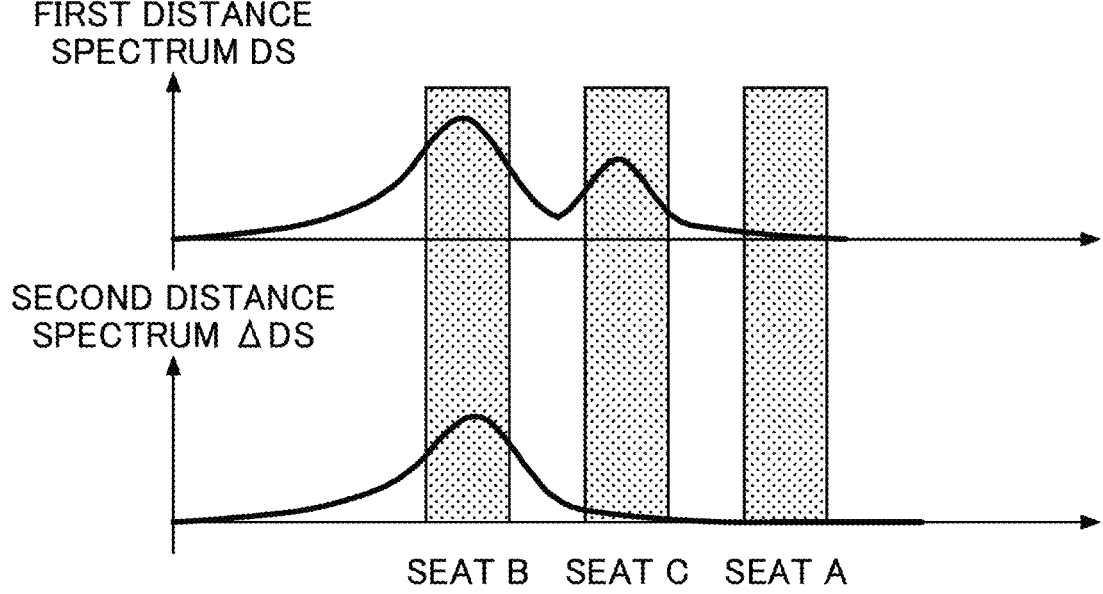
FIG. 4B is a diagram illustrating an example of distributions of a first distance spectrum DS and a second distance spectrum ΔDS at seats A, B, and C.

FIG. 4B is a diagram illustrating an example of distributions of a first distance spectrum DS and a second distance spectrum ΔDS at seats A, B, and C. As viewed from the standing wave radar 100, the seat A is the farthest and the seat B is the closest; therefore, the seats B, C, and A are illustrated in this order from the left side to the right side on the horizontal axis in FIG. 4B.

The first distance spectrum DS is 0 at the seat A. This is because there is no object on the seat A. In addition, the first distance spectrum DS has peaks at the seats B and C. As a result, presence of objects at the seats B and C and the distances from the standing wave radar 100 to the objects can be determined.

The second distance spectrum ΔDS is 0 at the seat A. This is because there is no object on the seat A. In addition, the second distance spectrum ΔDS has no peak also at the seat C. This is because the baggage 30 being a stationary object is present on the seat C. In addition, the second distance spectrum ΔDS has a peak at the seat B. This is because the occupant 20 is seated on the seat B and the peak based on the body motion of the occupant 20 is detected. As a result, presence of the non-stationary object at the seat B and the distance from the standing wave radar 100 to the non-stationary object can be determined. In other words, it can be determined that the occupant 20 is present on the seat B.

In addition, by comparing the first distance spectrum DS with the second distance spectrum ΔDS, it can be determined that a stationary object is present at the seat C. In this way, the occupant detection system 200 can detect whether either of a stationary object or a non-stationary object is present at any of the seats A, B, and C.

Note that a seat or the like can also be determined as a stationary object in substantially the same way as the baggage 30. In addition, regarding what type of object is determined as an stationary object in the interior of the vehicle 10, data of a reflected signal is obtained in advance and held as an initial value, and by executing a process of subtracting the initial value from the data of the reflected signal upon observation, an object can be excluded from the detection target.

<Flowchart>

Figure 5:
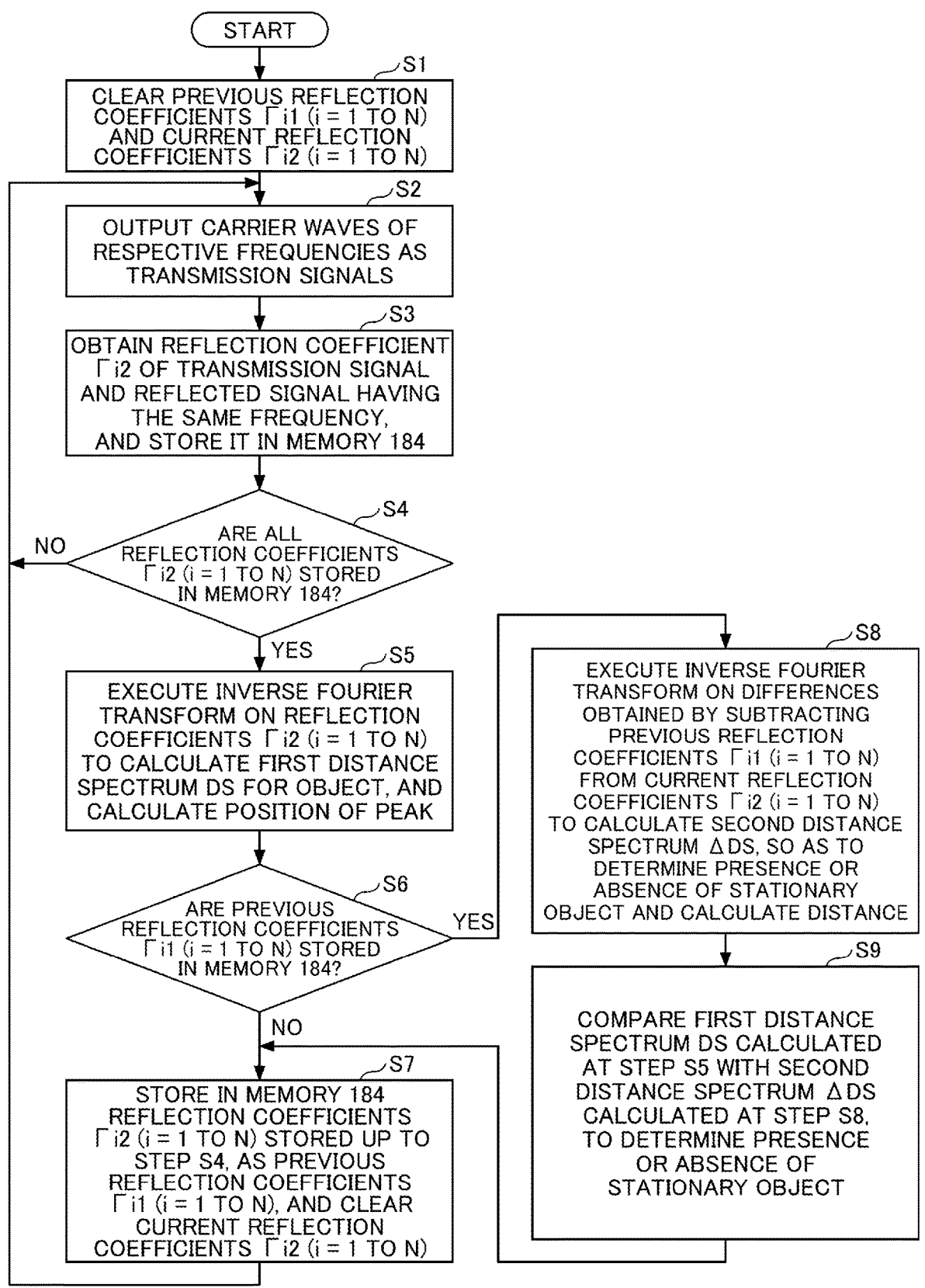
FIG. 5 is a flow chart illustrating a process executed by a control device 180 during an occupant detection period.

FIG. 5 is a flow chart illustrating a process executed by a control device 180 during an occupant detection period.

Once the process starts, the control unit 181 clears the reflection coefficients Γi1 (i=1 to N) of the multiple frequencies fi (i=1 to N) stored in a previous storing process and the reflection coefficients Γi2 (i=1 to N) of the multiple frequencies fi (i=1 to N) stored in a current storing process stored in the memory 184 (Step S1).

The control unit 181 causes the carrier wave output unit 150 to sequentially set the frequency of the carrier wave to the multiple frequencies in a time-division manner, and output the carrier wave taking the respective frequencies as a transmission signal (Step S2). As a result, the control device 180 receives in a time-division manner a reflected signal of the multiple frequencies generated by the transmission signal taking the respective frequencies being reflected by the object in a time-division manner.

The reflection coefficient measurement unit 182 executes at Step S2 a storing process of obtaining a reflection coefficient Γi2 of a transmission signal and a reflected signal taking the same frequency with each other for the transmission signal output by the carrier wave output unit 150 and the reception signal received by the control device 180, and storing the obtained reflection coefficient in the memory 184

(Step S3). The process at Step S3 is executed for each of the frequencies of the transmission signal and the reflected signal.

The control unit 181 determines whether all of the reflection coefficients Γi2 (i=1 to N) of the multiple frequencies fi (i=1 to N) are stored in the memory 184 (Step S4). Step S4 is a process of determining whether the reflection coefficients Γi2 for all of the N frequencies fi (i=1 to N) are stored in the memory 184.

If it is determined that not all of the reflection coefficients Γi2 (i=1 to N) of the multiple frequencies fi (i=1 to N) are stored in the memory 184 (NO at Step S4), the control unit 181 causes the flow to return to Step S2. This is to repeatedly execute the process of causing the carrier wave output unit 150 to sequentially output a carrier wave taking multiple frequencies, receiving a reception signal taking the respective frequencies, obtaining the reflection coefficient Γi2 to be stored in the memory 184.

In addition, if it is determined at Step S4 that all of the reflection coefficients Γi2 (i=1 to N) of the multiple frequencies fi (i=1 to N) are stored in the memory 184 (YES at Step S4), by executing an inverse Fourier transform on the reflection coefficients Γi2 (i=1 to N) of the multiple frequencies fi (i=1 to N) stored in the memory 184, the control unit 181 executes a process of the first inverse Fourier transform to calculate a first distance spectrum DS for the object, so as to obtain the first distance spectrum DS and obtain the position of the peak (Step S5). The processing at Step S5 is, a process of obtaining the first distance spectrum DS for the object and further obtaining the position of the peak, by executing an inverse Fourier transform on the reflection coefficients Γi2 (i=1 to N) of the multiple frequencies fi (i=1 to N) obtained in the period of time T.

The control unit 181 determines whether the reflection coefficients Γi1 (i=1 to N) of the multiple frequencies fi (i=1 to N) stored in the memory 184 in the previous storing process are stored in the memory 184 (Step S6). This is to determine whether the reflection coefficients Γi1 (i=1 to N) of the multiple frequencies fi (i=1 to N) stored in the memory 184 in the previous storing process and the reflection coefficients Γi2 (i=1 to N) of the multiple frequencies fi (i=1 to N) stored in the memory 184 in the current storing process are all set.

If it is determined that the reflection coefficients Γi1 (i=1 to N) of the multiple frequencies fi (i=1 to N) stored in the memory 184 in the previous storing process are not stored in the memory 184 (NO at Step S6), the control unit 181 clears the current reflection coefficients Γi2 (i=1 to N) of the multiple frequencies fi (i=1 to N), by causing the memory 184 to store the reflection coefficients Γi2 (i=1 to N) of the multiple frequencies fi (i=1 to N) stored in the memory 184 in the processing up to Step S4 as the reflection coefficients Γi1 (i=1 to N) of the multiple frequencies fi (i=1 to N) stored in the memory 184 in the previous storing process (Step S7). Once completed the processing at Step S7, the control unit 181 causes the flow to return to Step S2. This is to obtain the current reflection coefficients Γi2 (i=1 to N) of the multiple frequencies fi (i=1 to N).

In addition, if it is determined at Step S6 that the reflection coefficients Γi1 (i=1 to N) of the multiple frequencies fi (i=1 to N) stored in the memory 184 in the previous storing process are stored in the memory 184 (YES at Step S6), the control unit 181 executes an inverse Fourier transform on differences between reflection coefficients obtained by subtracting the reflection coefficients Γi1 (i=1 to N) of the multiple frequencies fi (i=1 to N) stored in the memory 184 in the previous storing process from the reflection coefficients $\Gamma i2$ (i=1 to N) of the multiple frequencies fi (i=1 to N) stored in the memory 184 in the current storing process, so as to calculate a second distance spectrum $\Delta DS$, and based on the second distance spectrum $\Delta DS$, and determine presence or absence of the non-stationary object and calculate the distance (Step S8). The processing at Step S8 is the second inverse Fourier transform process of calculating the second distance spectrum $\Delta DS$, and the second distance measurement process of determining presence or absence of a non-stationary object and calculating the distance to the non-stationary object, based on the second distance spectrum $\Delta DS$.

Assuming that the period of time T1 is a period of time in which the previous processing is executed, and the period of time T2 is a period of time in which the current processing is executed, the processing at Step S8 is a process of executing an inverse Fourier transform on differences between reflection coefficients obtained by subtracting the reflection coefficients $\Gamma i1$ (i=1 to N) of the multiple frequencies fi (i=1 to N) in the period of time T1 from the reflection coefficients $\Gamma i2$ (i=1 to N) of the multiple frequencies fi (i=1 to N) in the period of time T2, so as to calculate a second distance spectrum $\Delta DS$, and based on the second distance spectrum $\Delta DS$, determine presence or absence of the non-stationary object and calculates the distance.

The control unit 181 compares the first distance spectrum DS obtained at Step S5 with the second distance spectrum $\Delta DS$ obtained at Step S8, to determine presence or absence of a stationary object (Step S9). Once completed the processing at Step S9, the control unit 181 causes the flow to proceed to Step S7. This is to change generations of the reflection coefficients $\Gamma i1$ (i=1 to N) and the reflection coefficients $\Gamma i2$ (i=1 to N) of multiple frequencies fi (i=1 to N), by causing the memory 184 to store the reflection coefficients $\Gamma i2$ (i=1 to N) of the multiple frequencies fi (i=1 to N) stored in the memory 184 in the current storing process as the reflection coefficients $\Gamma i1$ (i=1 to N) of the multiple frequencies fi (i=1 to N) stored in the memory 184 in the previous storing process, and obtaining reflection coefficients $\Gamma i2$ (i=1 to N) of multiple new frequencies fi (i=1 to N) in the next control period.

Effects

The standing wave radar 100 includes: a transmitter configured to set a frequency of a transmission signal to multiple frequencies, and output the transmission signal taking the respective frequencies in a time-division manner; a receiver configured to receive a reflected signal taking the multiple frequencies in a time-division manner, the reflected signal being the transmission signal taking the multiple frequencies reflected by an object; a reflection coefficient measurement unit 182 to obtain reflection coefficients of the multiple frequencies by obtaining each reflection coefficient of the transmission signal and the reflected signal taking the same frequency with each other, for the transmission signal taking the multiple frequencies and the reflected signal taking the multiple frequencies; a control unit 181 to execute a first inverse Fourier transform process of calculating a first distance spectrum for the object by executing an inverse Fourier transform on the reflection coefficients of the multiple frequencies, and the first distance measurement process of determining presence or absence of an object and calculating the distance to the object, based on the first distance spectrum. In this way, by executing an inverse Fourier transform on the reflection coefficients of the multiple frequencies to calculate the first distance spectrum for the object, a short-distance object can be detected.

Therefore, a standing wave radar can be provided that can detect an object at a short distance with a simple configuration without measuring at multiple points, by calculating a distance spectrum to the object by executing an inverse Fourier transform on a reflection coefficient of a reflected signal with respect to a transmission signal. In addition, the object detection method is implemented by the standing wave radar 100. Therefore, an object detection method can be provided that can detect an object at a short distance with a simple configuration without measuring at multiple points, by calculating a distance spectrum to the object by executing an inverse Fourier transform on a reflection coefficient of a reflected signal with respect to a transmission signal. In addition, the occupant detection system 200 includes the standing wave radar 100. Therefore, an occupant detection system 200 can be provided that can detect an object at a short distance with a simple configuration without measuring at multiple points, by calculating a distance spectrum to the object by executing an inverse Fourier transform on a reflection coefficient of a reflected signal with respect to a transmission signal.

In addition, the standing wave radar 100 further includes a memory 184, wherein the control unit 181 executes a storing process of obtaining the reflection coefficients of the multiple frequencies repeatedly determined at predetermined time intervals by the reflection coefficient measurement unit 182, and storing the reflection coefficients in the memory 184; and for each of the multiple frequencies, obtains a difference between a reflection coefficient stored in the memory 184 in the previous storing process and a reflection coefficient stored in the memory 184 in the current storing process; executes a second inverse Fourier transform process of calculating a second distance spectrum for the non-stationary object by executing an inverse Fourier transform on the difference obtained for each of the multiple frequencies, and a second distance measurement process of determining presence or absence of a non-stationary object and calculating the distance to the non-stationary object, based on a second distance spectrum. In this way, by calculating the second distance spectrum to the object by executing an inverse Fourier transform on the differences between the reflection coefficients stored in the memory 184 in the previous storing process and the reflection coefficients stored in the memory 184 in the current storing process, only a non-stationary object can be detected.

Therefore, the standing wave radar 100, the object detection method, and the occupant detection system 200 can be provided that are capable of detecting only a non-stationary object with a simple configuration, without measuring at multiple points, by calculating a second distance spectrum to the object by executing an inverse Fourier transform on differences between reflection coefficients stored in the memory 184 in a previous storing process and in a current storing process.

In addition, the control unit 181 determines whether an object that has reflected the transmission signal is a non-stationary object or a stationary object, based on the first distance spectrum DS and the second distance spectrum $\Delta DS$. By comparing the first distance spectrum DS with the second distance spectrum $\Delta DS$, a stationary object can be identified.

Therefore, the standing wave radar 100, the object detection method, and the occupant detection system 200 can be provided that are capable of determining whether it is a non-stationary object or a stationary object by comparing the first distance spectrum DS with the second distance spectrum ΔDS.

In addition, the occupant detection system 200 includes the standing wave radar 100 provided on the vehicle 10; a signal generator 170 provided in the standing wave radar 100 and configured to generate a detection signal for detecting whether or not a seat belt is being fastened in the vehicle 10; an RFID tag 210 provided in the vehicle 10 and configured to detect whether or not a seat belt is being fastened; and a fastening determination unit 183 provided in the standing wave radar 100 and configured to determine whether or not a seat belt is being fastened, wherein the transmitter outputs a signal on which the detection signal is superimposed; in response to the signal on which the detection signal is superimposed, the RFID tag 210 outputs a response signal indicating a detection result regarding whether or not the seat belt is being fastened; and the fastening determination unit 183 determines whether or not the seat belt is being fastened based on the response signal. Therefore, the occupant detection system 200 can be provided that can determine whether an object is a non-stationary object or a stationary object, and determine whether or not a seat belt is being fastened on a seat sit by an occupant being a non-stationary object.

In the case where it is determined that a seat belt is not fastened on a seat sit by an occupant, the occupant detection system 200 may issue a warning indicating that the seat belt is not fastened, or may notify a higher-level device or the like connected to the occupant detection system 200 to issue a warning.

Note that as above, embodiments have been described in which the standing wave radar 100 switches between an occupant detection period and a fastening detection period in a time-division manner to determine presence or absence of an occupant and measure a distance, and detect whether or not a seat belt is being fastened. However, the standing wave radar 100 may detect whether a seat belt is being fastened based on a transmission signal for determining presence or absence of an occupant and measuring the distance, without switching between the occupant detection period and the fastening detection period in a time-division manner. In this case, the transmission signal for determining presence or absence of an occupant and measuring the distance simply needs to be a signal obtained by superimposing a detection signal on a carrier wave.

As above, the standing wave radar, the occupant detection system, and the object detection method have been described according to exemplary embodiments in the present disclosure; note that the present disclosure is not limited to the specifically disclosed embodiments, and various modifications and changes may be made without departing from the scope of the claims.

What is claimed is:

1. A standing wave radar comprising:
   a transmitter configured to set a frequency of a transmission signal to multiple frequencies, and output the transmission signal taking the respective frequencies in a time-division manner;
   a receiver configured to receive a reflected signal taking the multiple frequencies in a time-division manner, the reflected signal being the transmission signal taking the multiple frequencies reflected by an object; and
   a processor configured to
      obtain reflection coefficients of the multiple frequencies by obtaining each reflection coefficient of the transmission signal and the reflected signal taking a same frequency with each other, for the transmission signal taking the multiple frequencies and the reflected signal taking the multiple frequencies,
      execute a first inverse Fourier transform process of calculating a first distance spectrum for the object by executing an inverse Fourier transform on the reflection coefficients of the multiple frequencies, and a first distance measurement process of determining presence or absence of the object and calculating a distance to the object, based on the first distance spectrum,
wherein the standing wave radar further comprises:
a storage,
wherein the processor is further configured to execute:
   obtaining the reflection coefficients of the multiple frequencies repeatedly determined at predetermined time intervals, and storing the reflection coefficients in the storage,
   obtaining, for each of the multiple frequencies, a difference between a reflection coefficient stored in the storage in a previous storing process and a reflection coefficient stored in the storage in a current storing process,
   a second inverse Fourier transform process of calculating a second distance spectrum for a non-stationary object by executing an inverse Fourier transform on the difference obtained for each of the multiple frequencies, and
   a second distance measurement process of determining presence or absence of the non-stationary object and calculating the distance to the non-stationary object, based on the second distance spectrum.

2. The standing wave radar as claimed in claim 1, wherein the processor determines whether the object that has reflected the transmission signal is a non-stationary object or a stationary object, based on the first distance spectrum and the second distance spectrum.

3. An occupant detection system comprising:
   the standing wave radar as claimed in claim 2, provided on a vehicle;
   a signal generator provided in the standing wave radar and configured to generate a detection signal for detecting whether or not a seat belt is being fastened in the vehicle;
   a detector provided in the vehicle and configured to detect whether or not the seat belt is being fastened; and
   a fastening determiner provided in the standing wave radar and configured to determine whether or not the seat belt is being fastened,
   wherein the transmitter outputs the transmission signal on which the detection signal is superimposed, and
   wherein, in response to the signal on which the detection signal is superimposed, the detector outputs a response signal indicating a detection result regarding whether or not the seat belt is being fastened, and
   wherein the fastening determiner determines whether or not the seat belt is being fastened based on the response signal.

4. An object detection method executed by a standing wave radar including:
   a transmitter configured to set a frequency of a transmission signal to multiple frequencies, and output the transmission signal taking the respective frequencies in a time-division manner;
   a receiver configured to receive a reflected signal taking the multiple frequencies in a time-division manner, the reflected signal being the transmission signal taking the multiple frequencies reflected by an object; and a processor, the object detection method comprising:

obtaining reflection coefficients of the multiple frequencies by obtaining each reflection coefficient of the transmission signal and the reflected signal taking a same frequency with each other, for the transmission signal taking the multiple frequencies and the reflected signal taking the multiple frequencies, executing a first inverse Fourier transform process of calculating a first distance spectrum for the object by executing an inverse Fourier transform on the reflection coefficients of the multiple frequencies, and a first distance measurement process of determining presence or absence of the object and calculating a distance to the object, based on the first distance spectrum, wherein standing wave radar further includes a storage, and wherein the object detection method further comprising:

obtaining the reflection coefficients of the multiple frequencies repeatedly determined at predetermined time intervals, and storing the reflection coefficients in the storage, obtaining, for each of the multiple frequencies, a difference between a reflection coefficient stored in the storage in a previous storing process and a reflection coefficient stored in the storage in a current storing process, executing a second inverse Fourier transform process of calculating a second distance spectrum for a non-stationary object by executing an inverse Fourier transform on the difference obtained for each of the multiple frequencies, and executing a second distance measurement process of determining presence or absence of the non-stationary object and calculating the distance to the non-stationary object, based on the second distance spectrum.

5. The object detection method as claimed in claim 4, the object detection method further comprising:

determining whether the object that has reflected the transmission signal is a non-stationary object or a stationary object, based on the first distance spectrum and the second distance spectrum.

* * * * *